Nov. 7, 1950 F. D. BRADDON Re. 23,291

GYRO VERTICAL

Original Filed April 16, 1941

INVENTOR
FREDERICK D. BRADDON
BY
Herbert H. Thompson
his ATTORNEY

Reissued Nov. 7, 1950

Re. 23,291

UNITED STATES PATENT OFFICE 23,291

GYRO VERTICAL

Frederick D. Braddon, Babylon, N. Y., assignor to The Sperry Corporation, a corporation of Delaware Original No. 2,409,659, dated October 22, 1946, Serial No. 388,736, April 16, 1941. Application for reissue October 22, 1948, Serial No. 55,861

14 Claims. (Cl. 33—204)

Figure 1:
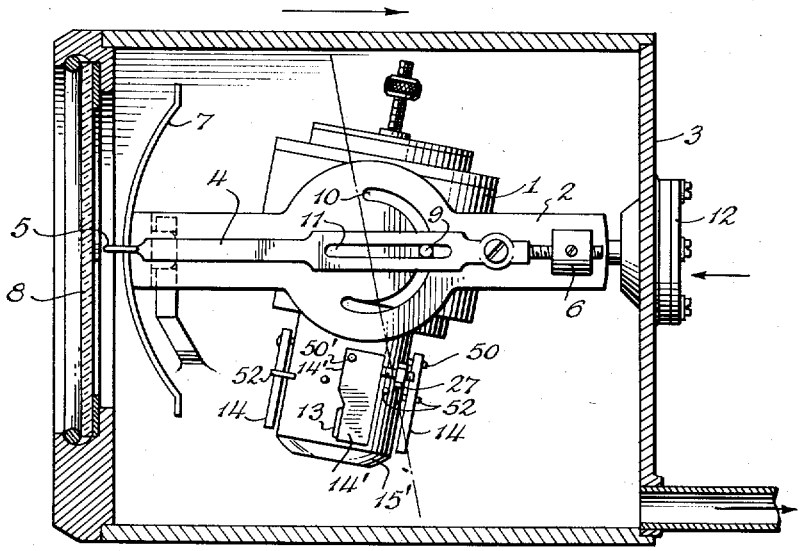

Matter enclosed in heavy brackets [ ] appears in the original patent but forms no part of this reissue specification; matter printed in italics indicates the additions made by reissue

This invention relates to gyroscopes designed to be used to indicate the true vertical or the true horizon, which are generally known in the art as gyro-verticals or gyroscopic artificial horizons, Such gyroscopes are employed not only as visual indicators, but also as base lines from which to control the lateral and longitudinal stability of aircraft.

As at present constructed, such instruments are usually mounted in substantially neutral equilibrium, although some are slightly pendulous. Gravitational control of such instruments is usually indirectly effected through pendulous members which control a suitable source of power to apply torque on the gyroscope at right angles to the tilt so that the gyroscope is directly erected to a vertical position. For purposes of this application such gyroscopes are referred to as automatic erecting gyro-verticals. During turns, however, such gravitational control erection devices cause the gyroscope to assume an inclined position due to the action of the centrifugal forces affecting the pendulous members. This deviation of the gyroscope is at a maximum at 180° of turn of an aircraft, which is found to ultimately result in forward tilt of the gyro vertical spin axis so that at the end of the turn the nose of the aircraft would be tilted down if the instrument were used as an automatic pilot or stabilizer, or if the aircraft human pilot followed the indications on the face of the instrument, and it is to this particular error that this invention is mainly directed.

It is the main object of the invention to compensate for this error in a simple manner. I am aware that proposals have heretofore been directed to this problem, but such proposals usually involve the employment of additional moving parts on the gyroscope itself, that must be controlled extraneously, adding weight and complication to the instrument, both of which are especially objectionable to aircraft instruments.

According to my invention, I so construct the gyroscope that although the same is permitted to precess freely under the action of centrifugal forces, acting through the gravitationally responsive controller, the resulting change in position is not apparent to the observer and therefore is unobjectionable.

While the gyro-vertical constructed in accordance with the present invention is particularly adapted for use in artificial horizon instruments, it is not intended that its use be so restricted as the same can be employed in other types of instruments for dirigible craft such as aircraft, ships or other dirigible craft in which the errors caused by acceleration force are likewise effective.

One of the features of the invention resides in provision for locating the spin axis of the erecting gyro in a normal operating position in which the same is forwardly inclined in the direction of its translational movement; that is, instead of the gyroscope being truly vertical, it is inclined in a plane having a fore and aft component.

My invention also consists in so constructing and arranging the automatic erection device for the gyro-vertical that the gyroscope is maintained in such inclined position about its athwartship axis regardless of turns.

Other objects, features and structural details of the invention will be apparent from the following description when read in connection with the accompanying drawing, wherein Fig. 1 is a side elevation of a gyro vertical, in which the present inventive concepts are embodied, the same being herein shown in practical employment in an artificial horizon instrument, the housing of which is illustrated in section.

Figure 2:
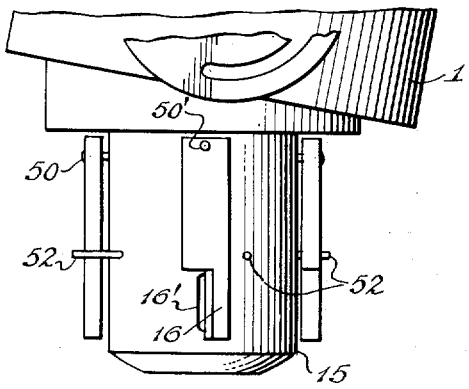

Fig. 2 is an enlarged detail view of a portion of the gyro casing showing a modification of the construction of the same illustrated in Fig. 1. [, and Fig. 3 is a view similar to Fig. 1 showing a modified form of the invention in which the erection of the gyro instrument is controlled by electromagnetic means.]

With reference to Fig. 1, the improved gyro includes a casing 1 which provides a housing for the rotor element. The present gyro is shown in its normal operating position in this figure, the arrangement of the same with its enclosed rotor being such that the spin axis of the rotor is inclined from its customary vertical attitude. The inclination is exaggerated in the drawings for the sake of clearness. The gyro casing 1 is mounted to oscillate about a horizontal athwartship axis within the universal support provided by gimbal ring 2 which is pivotally mounted, in turn, along a normally fore and aft axis within the housing 3 of an artificial horizon instrument in the instant case. This instrument includes the lever 4 which is pivoted to the side of the gimbal 2. A horizon indicating bar 5 forms a portion of the lever 4, the bar being balanced by counterweight 6. The bar extends in front of a mask 7 on which are placed suitable indications against which the position assumed by the bar may be observed or compared, the mask being situated to the rear of window 8 provided in the housing 3. A pin 9 extends from the gyro case 1, through the arcuate slot 10 in the gimbal ring 2 and operates in the longitudinal slot 11 to control movement of the bar 5. Air is supplied to the interior of the instrument in a suitable manner to drive the rotor and provide for the erection of the gyro, the same being introduced through a suitable filter 12 in the present instance. The specific construction of the gyro of this type as herewith disclosed and described is illustrative only, the same being more particularly shown in Patent No. 2,078,560, issued to B. G. Carlson et al. on April 27, 1937, for Artificial horizons.

The erecting means for the gyro is fundamentally similar to that shown in the noted patent and consists of pairs of oppositely arranged vents 13 through which the amount of air being exhausted therethrough is controlled by cooperating pendulous vanes 14 situated on the exterior lower portion of the gyro casing. The fore and aft arranged pair of vanes 14 are mounted on a common shaft 50, journaled in the hollow lower extension 15′ of the gyro case, and control ports directed fore and aft. The athwartship pair of vanes 14′ are mounted in said extension in a similar manner and control oppositely directed athwartship ports 13. In this type of erection device the rate of precession due to the erection device, i. e., the rate of erection, is substantially constant during turns because the effected shutters are usually against the stops 52, with one port wide open and the other closed during turns.

The novel construction incorporated in the form of the gyro shown in Fig. 1 to embody the present inventive concepts consists in modifying the construction of the athwartship erector vanes 14′ by the addition of the weight member 27 and changing the position of pin 9 which extends from the gyro casing 1 in order to provide for a zero indication by the bar 5 on the mask 7 when the spin axis of the gyro is inclined in the desired manner.

For a 180° turn of the craft at a given rate of turn, the force of acceleration by affecting the pendulous erecting means of a gyro of the prior type in which the spin axis is normally in a vertical position causes the device to precess and gives an indication to the observer of the movement of the bar 4 with relation to the mask 7 in the following way. At the start of the turn, the spin axis of the gyro is vertical and the horizon bar 5 is in a normal horizontal position at the zero indication on the mask 7. When the craft has completed a 90° right turn, for example, at the given rate of turn, the gyro is precessed due to the force of acceleration affecting the aft pendulous vane, to swing the same away from its associated vent, to take a position for the assumed rate of turn of the craft that would give a visual indication of the bar against the mask showing, for example, a 3° pitch and 3° bank of the craft. Continuing the turn at the assumed rate, when the same is completed at 180°, the turn indication error due to the erector controls then being at a maximum, the bank indication of the bar on the mask has been eliminated and also by reason of the relative change in position of the casing of the instrument with respect to the gyro, the bar will give an indication against the mask of double the assumed previous pitch indication of 3° or 6° in all. Thus, at the end of such a turn the heretofore used instrument erroneously indicates to the pilot of the craft that the same is in a pronounced climb.

In accordance with the present invention, this error is corrected by situating the spin axis of the gyro in a forwardly inclined normal operating position, such inclination being in the direction of the translational movement of the gyro. The inclination from the vertical of the gyro is about its athwartship axis in which position it is maintained regardless of heading of the craft. In the type of gyro-vertical shown in Fig. 1 where the normal operating inclination of the spin axis is uniform, turn indication error in the instrument is completely eliminated for a selected rate of turn of the craft, which rate depends upon both such angle of inclination and the normal rate of erection of the gyro-vertical due to the erection device. In other words, the angle of inclination and the erection rate are so chosen that for a selected rate of turn the gyro will precess through an angle twice its normal angle of inclination from the vertical during a 180° turn of the craft so as to cause the spin axis to have become inclined in the opposite direction in space during this time, which of course means that the gyro, as viewed from the craft, will have remained at the same inclination as before. The gyro inclination may therefore be selected to completely eliminate the turn error for any selected rate of turn with any predetermined rate of erection. The rate of turn for which complete correction is provided is governed somewhat by the service in which the instrument is used, but in most cases the selected rate chosen is the so-called standard rate of turn of 180° per minute, since such rate is used more than any other in procedure maneuvers and approaches to airports, and hence is frequently referred to as a procedure turn. My invention, however, is effective to materially reduce the turn error in question at rates of turn other than the selected rate, the errors of my inclined gyro being materially less than those of the ordinary vertical axis instrument for all rates of turn less than twice the selected rate.

The inclined gyro-vertical, as shown in Fig. 1, is maintained in this normal operating position by the construction in this instance of the athwartship pendulous vanes of the erecting means and the relation of the same to their respective oppositely disposed vents 13. When conditioned as shown, the force of reaction of the air passing through the respective vents is balanced so that the spin axis of the gyro maintains its position about the athwartship axis of its universal support by means of the erecting control devices. Also, in this instance, the pin 9, or other member through which control of an instrument is exerted, is changed in position with respect to the gyro case so that the associated lever 4 and horizon indicating bar 5 are situated in a zero position when the gyro is normally conditioned.

In a procedure 180° turn of the craft at the same rate of turn as that used in the example heretofore given the inclined gyro-vertical acts and gives an indication to the observer of the bar 5, by way of comparison with the example, in the following way. It is assumed at this point that the particular rate of turn chosen in the example is correct for the designed degree of inclination of the spin axis of the gyro and the rate of erection of its erecting control means in normal operation. At the start of the turn, the spin axis of the gyro is inclined as shown in Fig. 1 at the desired designed degree of inclination from the vertical, the same being forwardly inclined in the direction of its translational movement, as shown by the arrow. The bar 5 of the artificial horizon is in its horizontal position at the zero indication on the mask 7. When the craft has completed 90° of the assumed right turn, at the given rate of turn, the gyro is precessed due to the increase in air reaction by the opening of the aft vent as hereinafter noted. However, it is desired to point out that the pin 9 does not change its position with relation to lever 4 so that there is no change in the visual indication of the bar 5 against the mask 7. This is caused by reason of the fact that the initial inclination from the vertical which is 3° in this instance, at this point counter-balances in amount the 3° bank indication in the previous example. Also because of the gyro's erection by the erecting control devices, the zero pitch indication of the instrument remains the same. As viewed in Fig. 1, this may be seen by considering the spin axis of the gyro moved to a vertical position but now extending toward the reader at the inclination of 3° from the vertical about the illustrated fore and aft axis. Continuing the turn at the assumed rate, when the same is completed at 180°, there is still no indication of error on the instrument in either bank or pitch of the bar 5 with relation to mask 7. At this point, any bank indication is eliminated because of the change in position of the casing 3 with respect to the gyro as was the case in the prior example. The gyro has now precessed due to the acceleration forces affecting the pendulous vanes so that the spin axis of the same may now be considered to be in the position shown by the dot-dash lines in Fig. 1, which is 3° inclined from the vertical. The pin 9 is now on the other side of the drawing and the bar 5 and mask 7 are at the right-hand side of the sheet instead of the left. The relative position of the parts consequently remains unchanged and there is no faulty indication on the instrument of a climb. Consequently, it will be understood that the normal rate of erection of the improved gyro is such as to precess the same through an angle of twice the angle of initial inclination of the gyro spin axis during a procedure turn of 180° of the craft. The erecting control devices are also such that the gyro's rate of erection is such as to maintain its normal inclination in direction and amount with reference to the heading of the craft. As seen from another point of view, it may be considered that the spin axis of the inclined gyro-vertical is caused to describe a cone at a rate substantially equal to the rate of turn of the craft. More specifically, it may be proven graphically and mathematically that by use of the inclined axis method of compensating turn error complete correction of both bank and pitch components obtains for any angle of turn.

With reference to Fig. 2, a modification of the invention is shown in which the extension 15 on the casing, including the ports 16' from which the air issues, is angularly disposed with relation to the rotor case so as to be truly vertical, whereby the erecting forces are balanced when the erector extension is in a vertical position with the spin axis and main casing 1 inclined as before. In this case, the pendulous vanes may be balanced about their pivots 50' so as to hang truly vertical, as in the hereinbefore referred to Carlson patent. Thus, in Fig. 1 the inclination is secured by eccentrically weighting the control pendulums 14' to cause them to hang at the desired inclination to the vertical, while in Fig. 2 it is the relation between the vertical pendulums and the main gyro casing 1 which is altered to secure the desired forward inclination.

[Adaptation of the invention to electrically driven and electromagnetically erected gyro-verticals is shown in the embodiment thereof depicted in Fig. 3. In this figure the method of obtaining the inclined axis is generally similar to the method employed in Fig. 2 rather than in Fig. 1, i. e., the controlling pendulum 20 hangs truly vertical while that portion of the erecting device attached to the casing is displaced or eccentric with reference to the spin axis, so that in the normal position it likewise is vertical and no erecting forces effectively reach the gyroscope. In this figure, the gyro case is indicated at 17, the same being universally supported by means of the inner gimbal ring 18 on major and minor axes 41 and 43. The exterior gimbal ring 19 of the arrangement universally and pivotally supports an electromagnetic erecting means through a U-shaped bracket 40 pivotally mounted thereon about horizontal axis 41 normal to the primary axis 42 of the gimbal. Said means is shown as formed of laminated stator ring 20 provided with slot 21 for accommodating a winding 22 for receiving three-phase current to produce a rotating magnetic field having a speed of rotation depending on the supply frequency. The inductor cooperating with the ring is indicated at 23, the same being of a hemispherical or cup shape and being mounted upon the gyro case 17 through the extension arm 24. As indicated above, the cup 23 is eccentrically arranged with respect to a vertical line passing through the center of gravity of the casing 17 so that the spin axis is normally erected in a forwardly inclined position about the athwartship axis of the casing support in accordance with the teaching of the invention.]

[An electromagnetic erecting means of the type disclosed in this figure is more particularly described in the patent to O. E. Esval et al., dated January 28, 1941, No. 2,229,645. In this type of erection device the erecting torque continues to increase as the relative inclination of the pendulum and gyro increases (within limits). This type of erection device is therefore said to be proportional to tilt, while the type shown in Figs. 1 and 2 is said to be of the "off-on" type, although actually proportional for very small relative tilts. With the type of erection device shown in Fig. 3, it has been found that the rate of precession during a turn is substantially independent of the rate of turn, as such, but on the other hand, varies with air speed. Therefore, this form of the invention has the advantage that it is correct for different rates of turn as long as the air speed remains approximately that for which the device is designed.]

[In this figure I also show means for varying the rate of erection during a turn so as to maintain the predetermined inclination of the instrument in direction and amount with reference to the heading of the craft regardless of changes in the operating conditions of the craft or, in this particular case, regardless of changes of speed. This is accomplished in the instant case by varying the current supply to windings 22 by suitable resistances inserted in series therewith by means of rheostat 25 settable at a particular position on the indicator 26 for air speed. I thereby provide means for varying the rate of erection of the gyro with air speed so that the forward inclination of the gyro may be maintained under varying conditions of air speed Claims to this specific combination, however, are reserved for my later filed application, joint with Walter Wrigley, Serial No. 566,568, filed December 4, 1944, for Inclined gyroscopic horizons.]

[Looked at from a slightly different standpoint, my invention may be analyzed in the following manner. Owing to the tilt of the rotor axis, the angular momentum of the gyroscope has a small component in the direction of the fore and aft axis, the magnitude of which is proportional to the sine of the angle of tilt of the rotor axis in the vertical plane containing the fore and aft axis of the vehicle. When the craft is turning, the erection devices are acted upon by centrifugal forces and therefore cause a torque to be applied to the gyroscope about its transverse axis. This torque precesses the horizontal component of the angular momentum of the gyroscope in azimuth. At some particular rate of turn the torque is of the proper value to orient this horizontal component at the same rate as the rate of turn of the vehicle, whereby, during the turning movement, the rotor axis maintains its initial position relative to the vehicle although continually orienting its position in azimuth, and it will be readily appreciated that this method of analyzing the operation can be used directly to predetermine the angle of rotor axis necessary for any particular gyroscope in order that turning errors may be avoided at a predetermined rate of turn.] *The invention is obviously adapted to gyro verticals of other types employing other types of erection device than that specifically shown herein.*

While I have described what I consider to be highly desirable embodiments of my invention, it is obvious that many changes in form could be made without departing from the spirit of my invention, and I, therefore, do not limit myself to the exact forms herein shown and described, nor to anything less than the whole of my invention as hereinbefore set forth, and as hereinafter claimed.

Thus, my invention is not limited to the particular type of erection device shown herein in Figs. 1 and 2, i. e., to the type in which the rate of precession during turns due to the erection device is substantially constant. If, however, an erection device is employed having a variable rate of erection during turns, such as a rate which varies with the relative angle between the gyro and its pendulous factor, [as in Fig. 3,] an inclination may still be chosen to give proper results, although in this case the inclination may vary with a different function of the aircraft's motion, i. e., the air speed of the craft.

Having described my invention, what I claim and desire to secure by Letters Patent is:

1. An automatic erecting gyro-vertical for dirigible craft having its normal operating position slightly inclined to the vertical about its athwartship axis, the erection device being so constructed and arranged that the rate of precession of the gyroscope caused thereby due to a procedure turn is sufficient to cause said inclination to be apparently maintained to the observer in the craft regardless of the resulting change in heading.

2. A universally supported gyro-vertical for dirigible craft in which the normal operating position of the spin axis of the gyro is forwardly inclined about its athwartship axis of support in the direction of its translational movement, and erecting means for the gyro adapted to cause precession of the gyroscope due to turning, at a rate approximating the rate of turn of the craft thereby maintaining the spin axis thereof substantially in said normal operating position regardless of turning of the craft.

3. A gyro-vertical having a casing, a universal support for the casing, erecting control devices for the gyro consisting of fore and aft and athwartship pendulous vanes cooperating with vents in the gyro casing, means for causing air flow through said vents, said athwartship vanes of the gyro being so situated with relation to their associated vents that the two vents are inoperative to exert a torque on the gyroscope only when the spin axis of the gyro is normally erected in a forwardly inclined position, about the athwartship axis of the gyro casing support.

[4. An electrically erected gyro-vertical having a casing, a universal support for the casing, and electromagnetically controlled erecting means eccentrically arranged with respect to the spin axis of the rotor by which the spin axis of the gyro is normally erected in a forwardly inclined position, about the athwartship axis of the casing support.]

5. A gyro-vertical having a rotor and a rotor bearing case, an erector extension case extending from said case, a universal support for the combined cases, means for supplying air within the combined cases to drive and effect erection of the gyro, and erecting control devices for the gyro comprising pendulous vanes cooperating with vents in the erector case through which air is exhausted, the erecting forces being balanced when the erector case is in a vertical position, said erector case being angularly positioned with relation to the rotor case so that when the effects of the erecting control devices are in balance the spin axis of the gyro is normally erected in an inclined position, about the athwartship axis of the support, in the direction of translational movement of the gyro.

6. An automatic erecting gyro-vertical for dirigible craft having a gravitationally responsive, power actuated erection device so constructed and arranged that the spin axis of the gyro is initially forwardly inclined at a predetermined angle to the vertical and its normal rate of erection is such as to precess the gyro through an angle twice said angle of inclination during a procedure turn of 180° of the craft.

7. An automatic erecting gyro-vertical for dirigible craft having a gravitationally responsive, power actuated erection device so constructed and arranged that the spin axis of the gyro is forwardly inclined at a predetermined angle to the vertical and its rate of erection during a procedure turn is such as to maintain such inclination in direction and amount with reference to the heading of the craft.

8. A gravity responsive attitude indicating or controlling gyroscopic instrument for traveling vehicles, including a gyro vertical of the kind in which gravity responsive means operate to produce an erecting torque about an axis substantially normal to the tilt to precess the rotor back in a direct path to its normal position whenever displaced therefrom, characterized by the fact that the rotor axis in its normal position is held so inclined to the vertical by said erecting torques that when acceleration forces arising during a turning movement of the vehicle act on the gravity responsive means, the rotor axis precesses at a rate to maintain substantially its initial position relative to the changing direction of travel of the vehicle.

9. A gravity responsive attitude indicating or controlling gyroscopic instrument for traveling vehicles, including a neutrally mounted gyro vertical of the kind in which gravity responsive means operate to produce an erecting torque about and axis substantially normal to the tilt to precess the rotor back in a direct path to its normal position whenever displaced therefrom, characterized by the fact that the gyroscope has a component of its angular momentum in the fore-and-aft direction and that the torque applied under the control of the gravity responsive means when the latter is disturbed by acceleration forces arising during a turning movement of the vehicle serves to precess this fore-and-aft component in azimuth at a rate to maintain it substantially fore-and-aft relative to the changing direction of travel of the vehicle under predetermined flight conditions.

10. In a universally supported gyro-vertical for aircraft, gravitationally responsive power operated means thereon eccentrically positioned with respect to the center of support of said gyro for normally positioning said gyro-vertical in a slightly inclined position having at least a component of its tilt lying in the fore and aft plane of the craft, said means being so designed that the rate of precession caused thereby during a procedure turn is the same as the rate of turn of the craft, whereby said inclined position of the gyro is maintained with respect to the craft.

11. As a means for correcting errors in a gyroscopic artificial horizon or gyro-vertical due to turning of aircraft so as not to be apparent, a universally and neutrally mounted gyroscope, a power actuated erection device, and gravitationally responsive means for controlling said device so constructed and arranged with respect to the gyroscope as to normally cause the gyroscope to become inclined at a predetermined angle in the fore and aft plane with respect to the craft and during turns cause precession of the gyroscope at the same rate as the craft turns, whereby no change in the position of the gyroscope takes place which is apparent to the pilot.

12. As a means for correcting errors in a gyroscopic artificial horizon or gyro-vertical due to normal turning of the craft so as not to be apparent, a universally mounted gyroscope, offset gravitationally responsive power operated means for positioning the gyro-vertical at a predetermined angle with respect to the craft, said means being so designed with respect to the gyroscopic moment that the rate of precession of said gyroscope due to said means when acted upon by the acceleration forces during procedure turns is the same as the rate of turn of the craft, whereby no change in the position of the gyroscope is apparent to the pilot.

[13. A gyro-vertical for dirigible craft in which the normal operating position of the spin axis of the gyro is forwardly inclined, a variable power erection device therefor, and means for adjusting the strength of said device to adjust the rate of precession resulting therefrom, whereby said inclination can be maintained under different flight conditions.]

[14. As a means for correcting errors in a gyroscopic artificial horizon or gyro-vertical due to normal turning of a craft so as not to be apparent, a universally mounted gyro rotor, gravitationally responsive power actuated means offset from the spin axis of the rotor for positioning the spin axis at a predetermined angle with respect to the craft, said means being so designed with respect to the gyroscopic moment that the rate of precession of said gyro rotor due to such means when acted upon by the acceleration forces during procedure turns of the craft is the same as the rate of turn of the craft, whereby no change in the position of the gyro rotor is made apparent to the pilot.]

15. A gyro-vertical as claimed in claim 11, characterized by the fact that the gyro-vertical has a horizon indicator eccentrically connected to the gyro-vertical so as to indicate that the aircraft is level when the gyro-vertical is forwardly inclined thereon at said predetermined angle.

[16. A gyro-vertical as claimed in claim 2, wherein said erecting means comprises a two-part eddy current device, one part being pendulously mounted under said gyro and the other part mounted on the gyro above said other part, one of the two parts being eccentrically arranged with respect to the spin axis of the gyro.]

[17. An eddy current erecting device for gyro-verticals having a casing and a rotor therein of the type wherein spin axis remains normally slightly forwardly inclined to the vertical, a universal support for said casing, a magnetic field radiator pendulously and universally supported under said casing, a cup of conducting material on said casing, means for causing relative rotation of said field and said cup, the cup, radiator and spin axis being so interrelated that in the normal position the spin axis is forwardly inclined, the erecting torque created by induction being such that said forward inclination is substantially maintained in direction and amount with reference to the heading of the craft during turns.]

18. In a gyroscopic artificial horizon for moving craft, a universally mounted gyroscope, a pendulum controller for erecting the spin axis of the gyroscope, and torque means governed by said controller for exerting a torque on said gyroscope about a horizontal axis substantially normal to the axis of relative tilt of said controller and gyroscope, said pendulum controller being eccentrically weighted about an athwartship axis to cause the same to hang with its bottom tilted rearwardly through a small angle, whereby the top of the gyroscope spin axis is normally tilted forwardly.

19. A gyroscopic horizon having a forwardly inclined spin axis, as claimed in claim 18, wherein said pendulum controller is provided with an adjustable eccentric mass forward of its athwartship pivotal mounting, whereby the tilt of the pendulum and gyroscope may be varied at will.

FREDERICK D. BRADDON.

REFERENCES CITED

The following references are of record in the file of this patent or the original patent:

UNITED STATES PATENTS

| Number | Name | Date |
|---|---|---|
| 2,229,645 | Esval et al. | Jan. 28, 1941 |